(12) United States Patent
Zhao et al.

(10) Patent No.: US 7,288,277 B2
(45) Date of Patent: Oct. 30, 2007

(54) INSTANTLY DISPERSIBLE PREGELATINIZED STARCHES FOR USE IN FOOD PRODUCTS

(76) Inventors: Jessie Jianxin Zhao, 27 Marion Dr., Plainsboro, NJ (US) 08536; Dale T. Bertrand, 231 Bordentown-Georgetown Rd., Columbus, NJ (US) 08022

( * ) Notice: Subject to any disclaimer, the term of this patent is extended or adjusted under 35 U.S.C. 154(b) by 180 days.

(21) Appl. No.: 10/861,262

(22) Filed: Jun. 4, 2004

(65) Prior Publication Data
US 2004/0258831 A1 Dec. 23, 2004

Related U.S. Application Data

(60) Provisional application No. 60/475,979, filed on Jun. 5, 2003.

(51) Int. Cl.
*A23L 1/0522* (2006.01)
(52) U.S. Cl. ........................ 426/578; 426/661
(58) Field of Classification Search ................ 426/658, 426/573, 578, 579, 661, 243
See application file for complete search history.

(56) References Cited

U.S. PATENT DOCUMENTS

| 391,445 A * | 10/1888 | Norsby ....................... 403/165 |
| 4,362,755 A * | 12/1982 | Mitchell et al. ............. 426/579 |
| 5,098,727 A * | 3/1992 | Geywitz et al. ............. 426/448 |
| 5,340,580 A * | 8/1994 | Barbera ....................... 424/738 |
| 5,597,603 A * | 1/1997 | Cha et al. .................... 426/573 |
| 2002/0014180 A1 * | 2/2002 | De Coninck ............. 106/205.7 |
| 2003/0087006 A1 * | 5/2003 | Buwalda et al. ............... 426/94 |

* cited by examiner

*Primary Examiner*—Arthur L. Corbin
(74) *Attorney, Agent, or Firm*—Thaddius J. Carvis

(57) ABSTRACT

A food thickener is provided in the form of agglomerated instant starch, which contains a combination of one or more pregelatinized starches and a specific water-soluble food ingredient possessing specific surface active functionality. The pregelatinized starch component can be either modified or native, and the water-soluble coating agent comprises a member selected from the group consisting of gum arabic, 1-octenyl succinic anhydride treated gum arabic, 1-octenyl succinic anhydride treated starches, 1-octenyl succinic anhydride treated maltodextrins, 1-octenyl succinic anhydride treated dextrins, and mixtures of any two or more of these. This novel thickener is comprised of more than about 50% pregelatinized starch and at least about 0.01% of a water-soluble food ingredient possessing surface active functionality. The thickener is useful in foods to provide spoon-stir dispersibility without lumping and can exhibit high and virtually instant viscosity development with little or no after thickening and are stable to long periods of storage. The thickener provides a smooth appearance and texture with high sheen.

19 Claims, 2 Drawing Sheets

INSTANTLY DISPERSIBLE PREGELATINIZED STARCHES FOR USE IN FOOD PRODUCTS

PRIORITY CLAIM

This application claims priority to prior U.S. Provisional Patent Application Ser. No. 60/475,979, filed Jun. 5, 2003.

BACKGROUND OF THE INVENTION

This invention relates to a new instantized/agglomerated pregelatinized (either cold water swelling or traditional pregel) starch and to its preparation and use in the preparation of a variety of products requiring complete starch dispersion and rapid viscosity development with little or no stirring. Among these products are foodstuffs such as thickened foods for dysphagia, instant dry mix desserts and pie fillings, instant beverages for the nutritional and functional food segments, dry mix soups & sauces, whipped toppings and similar processed food products. These products and others can be improved due to the presence of a category of instantized/agglomerated pregelatinized starch products with new properties.

Starch is known to become functional for rheologically altering the viscosity characteristics of various products, including but not limited to foods, only after being cooked in aqueous slurry beyond a critical temperature (i.e., the pasting temperature) such that the granules hydrate, swelling many times their original size. It is further known that the needs of the food industry dictate that starch often be precooked or pregelatinized so that viscosity and texture can be altered without the use of heat in the process. These pregelatinized starches are problematic in that in the powdered form they have a tendency to form undispersible lumps when introduced into aqueous systems. The process of agglomeration of these starch powders has mitigated this problem to a great extent but not without adversely impacting the performance of the end product.

One of the major disadvantages of agglomerated starches in the current markets is that the rate of hydration is too slow. When the starches are added to aqueous solutions, especially chilled ones such as milk, apple juice, etc., starches swell at slow speed and do not reach maximum viscosity until as long as half an hour, depending on starches and liquid medium. Another disadvantage is that they often result in an unusually coarse or pulpy appearance and texture being imparted to the finished food product by the agglomerated starch. In cases where a smooth appearance and texture is desirable, this is a definite drawback.

It would be desirable if there were instant food thickeners, especially in the medical-nutritional and spoon stirred beverage, soup, sauce and gravy markets, that dispersed without lumping yet attained maximum viscosity within a very short period of time (e.g., in less than five minutes). If available, such food products with instantly dispersible pregelatinized starches would have clear and significant processing and economic advantages.

The prior art has produced a number of starches that are suitable for use in instant food thickeners and sugar-free desserts, but dispersibility is often sacrificed to maintain a desired viscosity development. To date, means have been developed that circumvent these pit-falls such as the co-agglomeration of a starch with the food products in question, utilizing the bulk of the food product as a dispersing aid for the starch. This is an added cost to the food manufacturer and is not a suitable solution for the medical-nutritional food thickener market. Prior art starches have also failed to be successful in the commercial world where they have provided an improvement in initial dispersibility which is not stable over time due to chemical or physical changes in the starch composition. There is currently no product that offers all of the advantages of rapid dispersibility, rapid viscosity development and smooth appearance and texture. Current products all have serious compromises or lose these properties over time.

In an early attempt to make instant pudding compositions, U.S. Pat. No. 2,554,143 to Hinz, Jr., et al., describes a process to decrease lumping of the pudding upon addition of aqueous liquid. They set out to improve upon the instant puddings of Hinz, Jr., et al., in U.S. Pat. No. 2,500,179, which required a fine particle size for the starch to be satisfactorily smooth, but became lumpy when hydrated. They coat the starch particles with an oleaginous agent to inhibit hydration. Among the materials they suggest as coating agents are fats, oils and waxes. They apply the coatings at levels of up to about 10%. The oleaginous substance is applied in a milling operation following micropulverization. Experience with these types of products has not been fully satisfactory because they tend to have slow viscosity development and low viscosity levels, probably because the coating of the fatty material retards hydration. In addition, these materials tend to be unstable as wetability and dispersibility vary over time.

In another prior art approach, in U.S. Pat. No. 3,443,900, Decnop disclosed that a dry hydrophobic reaction product of cold water dispersible starch with a finely divided monoglyceride and/or diglyceride prior to heating and drying treatment. The same reaction between the monoglyceride and/or diglyceride and the amylose helix of the starch to which they attribute improved dispersibility is believed to continue unevenly on storage to result in products of variable quality. Here again, experience has not been fully satisfactory because these products tend to have slow viscosity development and low viscosity levels, and they tend to be unstable with wetability and dispersibility varying over time.

The problem of making an instantly dispersible pregelatinized starch composition was also addressed by Werbin, et al, in U.S. Pat. No. 3,582,350. They described a process wherein a pregelatinized flour or starch was suspended in aqueous slurry, mixed with a hydrophobic shortening material or blend with emulsifier, and subjected to a brief heat treatment at elevated temperature. Again, these products do not show a desired degree of dispersibility exhibiting stability over time.

Over the years, the quest for a high quality instant pudding provided incentive for research into ways to achieve a starch product suitable for use in instant puddings to provide excellent texture, creaminess, and mouth release effect. Among the efforts was the disclosure of U.S. Pat. No. 4,215,152, to O'Rourke, who taught making such a product by a process that comprises drum drying a slurry containing an ungelatinized starch in water with a protein and an emulsifier. Preferably the protein is sodium caseinate and the emulsifier is polysorbate 60. Similarly, In U.S. Pat. Nos. 4,260,642 and 4,362,755, Mitchell, et al., describe a process for preparing a pregelatinized modified starch suitable for use in instant puddings which comprises forming an aqueous slurry containing an ungelatinized starch and an effective amount of sodium or calcium stearoyl-2-lactylate, heating the slurry to a temperature and for a period of time sufficient to gelatinize the starch, and recovering the starch. The resultant pregelatinized modified starch is said to possess a smoother, creamier mouthfeel and has a high sheen.

Still in the context of dry instant pudding mixes, in U.S. Pat. No. 4,469,712, Katcher, et al., describe a process for providing puddings with improved texture and gloss, by incorporating a critical starch particle size distribution with a powdered sugar of a controlled particle size. They point out that U.S. Pat. No. 4,361,592 issued to Carpenter, et al., describes a pudding mix composition which, when combined with milk, produces a desirable, creamy, glossy pudding. Carpenter, et al., was said to teach that it is critical to making a glossy, creamy pudding with fine particles of pregelatinized starch that less than a maximum of 1%, by weight, of the starch has a particle diameter greater than 63 microns and that commercial pregelatinized starch at that time did not meet the requirements of Carpenter, et al., without further processing. They further state that Carpenter, et al., necessitates recycling the starch particles—sieving, and regrinding—thereby increasing the cost of production. They pointed out that U.S. Pat. No. 2,554,143 issued to Hinz, Jr., et al., teaches that fine starch particles can be used in an instant pudding mix, only if their rate of hydration is retarded such as by coating the starch with a hydrophobic material, such as a lipid or talc. As an alternative, Katcher, et al., described what they characterized as a new critical aspect that the total starch particle distribution wherein the vast majority of the starch particles have diameters smaller than 38 microns.

In another prior art attempt to improve the properties of pregelatinized starches, U.S. Pat. No. 4,575,395 to Rudin describes a process for producing a coated pregelatinized starch comprising blending a pregelatinized starch with a mixture of a non-toxic solvent and a food grade emulsifier followed by removing the solvent. Listed among the emulsifiers are a mixture of distilled propylene glycol monoesters, distilled monoglycerides, and sodium stearoyl lactylate, hydrophilic ethoxylated sorbitan monoesters, lecithin, monoglycerides, diglycerides, and mixtures. They also list a number of sugars and other carbohydrates. Suitable solvents are said to include ethanol, mixtures of water and ethanol, mixtures of water, ethanol and ethyl acetate whereby the ethyl acetate is present in small quantities such as a denatured ethyl alcohol.

In U.S. Pat. No. 4,726,958, Brown, et al., describes a process for producing an instant no-bake filling mix which upon reconstitution or hydration is said to have a glossy, smooth, creamy and firm texture with a sliceable pie cut characteristic on setting. The pre-filling mix is made by mixing all dry ingredients and then incorporating fat or oil, in a process said to be distinguished from those of Carpenter, et al, O'Rourke, Hinz, et al., and Rudin, all cited above, and others.

In U.S. Pat. No. 4,769,081, Maher describes enhancing the rate and ease of water dispersibility and/or water solubility of powdered or granular starch materials suitable for use various industrial end-use applications such as, for example, in paper sizing applications, as a wet end dry strength additive, in pigmented paper coating compositions, in packaging adhesive applications, in size press applications, in binder compositions, in textile sizing and finishing applications and the like. They achieve this by incorporating a small amount of a glycoside surfactant ingredient. Maher identifies as starch materials of particular interest, the various cold water-soluble pregelatinized starches, particularly pregelatinized potato starch and especially pregelatinized cationic potato starches. A glycoside and potato starch combination is exemplified as dry blending 50 parts by weight of a potato starch with 0.005% of a 50% solution of a $C_{12-13}$ alkyl glucoside surfactant having an average degree of polymerization of about 1.8. Their applicability to food products is not suggested or apparent.

In U.S. Patent Publication No. 2002/0014180, Marie, et al., describe another approach to preparing starch based dry mixes. They describe an agglomerated starch-based product which is a homogeneous powder wherein each powder particle is an agglomeration of randomly distributed fine grains of starch and maltodextrin. The agglomerated starch-based product is said to be readily dispersible in aqueous fluids and develops its full viscosity instantaneously. The maltodextrin used is a polymeric hydrophilic compound, being a glucose polymer, with a dextrose equivalent (DE) of less than 20, preferably a maltodextrin with DE not higher than 16, more preferably with DE of from 5 to 15 is applied. The maltodextrin is present in an amount of from 5% w/w to 95% w/w on dry base of the agglomerated starch-based product, preferably from 10% w/w to 75% w/w, and more preferably from 15% w/w to 50% w/w, most preferably in an amount of from 15% w/w to 40% w/w.

Thus, the art has long sought a suitably dispersible cold water-soluble starch that rapidly and fully disperses to achieve its potentially full viscosity within a very short period of time. However, the art is in need of improvement in terms of products, processes and their end uses which more fully meet the objectives of the art than heretofore achieved.

There remains a need in the art for instant/agglomerated pregelatinized starches that can be spoon stirred into solution hot or cold without the formation of lumps and that develop maximum viscosity in a very short amount of time and yet are shelf stable in terms of these properties.

BRIEF SUMMARY OF THE INVENTION

It is a primary object of the invention to provide a stable starch processed to provide immediate dispersibility in both hot and cold water.

It is another object of the invention to provide improved methods for preparing starch products to imbue them with rapid and complete dispersibility in both hot and cold aqueous solutions.

It is another object of the invention to provide a cold and hot water dispersible starch which instantly dissolves in water to provide a smooth appearance and texture.

It is another object of the invention to provide a cold and hot water dispersible starch which quickly dissolves in hydration water to provide a uniform viscosity over time.

It is another object of the invention to provide a starch which provides good dispersibility and rapid viscosity development in both cold or hot applications with little or no after thickening.

It is another object of the invention to provide a cold water dispersible starch which rapidly dissolves in water to provide a solution with high viscosity and result in products with high surface sheen.

It is another object of the invention to provide an efficient and economical process for preparing a hot and cold water dispersible starch which rapidly disperses and dissolves in water and other aqueous liquids to provide rapid viscosity development and products with a smooth texture and appearance.

It is another object of the invention to provide improved methods for preparing starch products to imbue them with rapid and complete dispersibility in both hot and cold aqueous solutions exhibit long term shelf stability.

It is yet another object of the invention to provide improved edible products characterized by predictable rapid and complete dispersibility in both hot and cold aqueous solutions.

It is yet another object of the invention to provide methods for making improved edible products characterized by predictable rapid and complete dispersibility in both hot and cold aqueous solutions.

It is yet another specific object of the invention to provide instant/agglomerated pregelatinized starches and methods for making and using them, where the starches can be spoon stirred into solution hot or cold without the formation of lumps and that predictably develop maximum viscosity in a very short amount of time and yet are shelf stable in terms of these properties.

Theses and other objects are achieved by this invention which provides new, rapidly dispersible food thickeners, processes for making and using them, products improved by the new food thickener and processes for their preparation.

In one aspect of the invention, there is provided an edible product thickener, e.g., food thickener, as an agglomerated composition comprising a combination of one or more high viscosity pregelatinized starches (either modified or native) coated with a specific type of water-soluble food ingredient possessing a specific water dispersing functionality of a member selected from the group consisting of gum arabic, 1-octenyl succinic anhydride treated gum arabic, 1-octenyl succinic anhydride treated starch, 1-octenyl succinic anhydride treated maltodextrin, 1-octenyl succinic anhydride treated dextrin, and mixtures of any two or more of these.

This novel food or edible product thickener of the invention (referred to herein as a thickener) is preferably comprised of more than about 50% pregelatinized starch and at least about 0.01% of a water-soluble food ingredient possessing specific surfactant functionality effective for dispersion of the thickener in water, both percentages being by weight based on the combined weight of these two components.

The food thickener of the invention is a viable and economical means to manufacture food and other edible products that provide spoon-stir dispersibility without lumping. Preferably, the food thickener exhibits high and virtually instant viscosity development with little or no after thickening and will exhibit long term shelf stability alone or after blending with other food ingredients. Further, preferred compositions provide smooth texture and appearance with a good surface sheen. The food thickeners of the invention are provided in the form of agglomerated instant starches.

The method for making the food thickeners of the invention comprises combining the pregelatinized starch component with water-soluble coating material comprising a member selected from the group consisting of gum arabic, 1-octenyl succinic anhydride treated gum arabic, 1-octenyl succinic anhydride treated starch, 1-octenyl succinic anhydride treated maltodextrin, 1-octenyl succinic anhydride treated dextrin, and mixtures of any two or more of these, in a manner effective to coat the starch effectively to provide improved dispersibility in water. Preferred processes include adding the water-soluble coating material to water used to agglomerate the starch, adding the water-soluble coating material to water used to suspend the starch component prior to spray drying, and intimately mixing the water-soluble coating material with the starch by dry mixing.

Many preferred aspects of the invention and examples of it will be described below.

DESCRIPTION OF THE DRAWINGS

The invention will be better understood and its advantages will be more apparent when the following detailed description is read in light of the accompanying drawings, wherein.

DETAILED DESCRIPTION OF THE INVENTION

Figure 1:
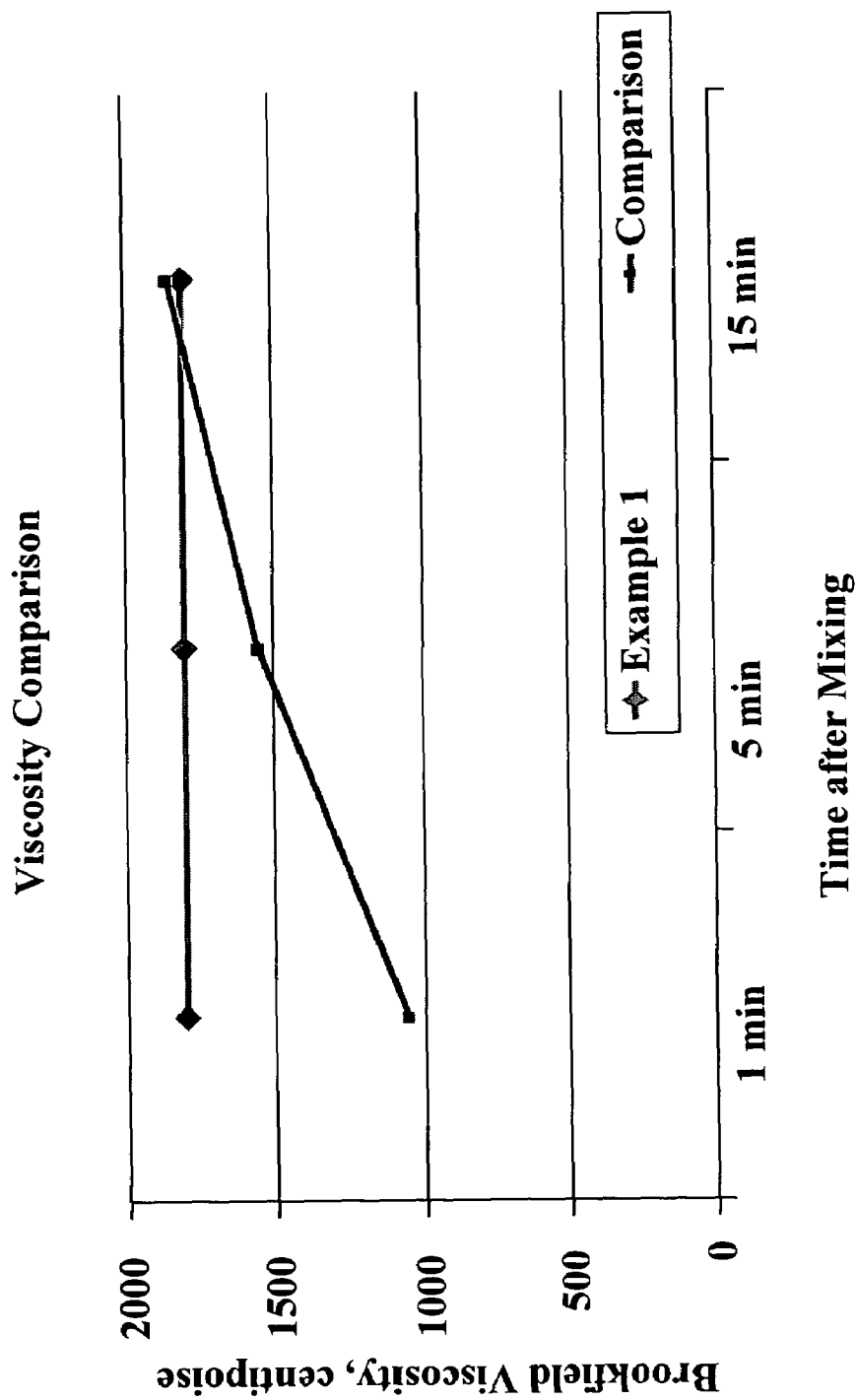
FIG. 1 is a graph showing a comparison of viscosity development for a starch made according to the invention and a commercial starch offered as being dispersible in cold water.

The invention is described below in terms of the preparation of specific instant/agglomerated pregelatinized starches that can be spoon stirred into solution hot or cold without the formation of lumps and that develop maximum viscosity in a very short amount of time and yet are shelf stable in terms of these properties. Products made with the thickeners of the invention are characterized by smooth texture and appearance as well as good surface sheen with little or no after thickening. The person skilled in the art will understand that while the specific materials and processing are intended to illustrate important aspects of the invention, the compositions can be adapted as necessary for other applications by the inclusion of ingredients important or desirable to those applications.

The starch component employed according to the invention will be pregelatinized and can be either a modified or native form of any of those starches of a grade suitable for food use as defined in the regulations governing food additives. The source of the pregelatinized starch is typically any one or combination of arrowroot, barley, corn, waxy maize, pea, potato, rice, waxy rice, sorghum, waxy sorghum, tapioca and wheat starch. The starch will be the major component of the thickener composition and will be combined with a minor amount of a water-soluble food ingredient possessing specific surfactant functionality effective for dispersion of the thickener in water.

The compositions of the invention provide an agglomerated combination of one or more high viscosity pregelatinized starches (either modified or native) coated with a specific type of water-soluble food ingredient possessing a specific water dispersing functionality of a member selected from the group consisting of gum arabic, 1-octenyl succinic anhydride treated gum arabic, 1-octenyl succinic anhydride treated starch, 1-octenyl succinic anhydride treated maltodextrin, 1-octenyl succinic anhydride treated dextrin, and mixtures of any two or more of these. (See, for example, 21 CFR §172.892 regarding 1-octenyl succinic anhydride treated starch.) The specific water-soluble food ingredients used to coat the starch in the agglomerated products, alter the surface characteristics of a pregelatinized starch in such a way as to allow for instant spoon dispersibility, smooth texture and appearance and quick attainment of viscosity plateau. It is a distinct advantage of the invention that this can be achieved without decreasing the ultimate viscosity and will provide end products having high surface sheen. In addition, because the coating materials have a limited, but specific degree of surfactant activity providing limited hydrophobicity specific to their carbohydrate structures and it is in a form not further reactive with the starch, they impart their surface modifying properties without affecting the long term stability of the products.

The term "food" as used herein is broad enough to include all edible compositions including those not necessarily intended as foods, e.g., those which might be considered primarily as nutritional supplements, health supplements, dietary supplements, medicines, or the like. All such foods can be thickened by the invention which provides a stable instantly dispersible pregelatinized agglomerated starch utilizing a defined coating agent effective to provide virtually immediate dispersibility and viscosity increase.

According to the invention, a pregelatinized starch component in an amount of at least 50%, preferably from about 99.98% to about 85%, is combined with a coating agent as defined above. The pregelatinized starch component can be either modified or native. The coating agent will be employed in an amount of from about 0.01% to about 15% based on the combined weight of it and the pregelatinized starch. Typical of the amount of coating applied is from about 0.5 to about 8%. The combination is in the form of an agglomerate, agglomeration taking place either before, after or concurrent with application of the coating agent.

The water-soluble coating materials of use in the invention have a water-soluble character and a specific surface active, hydrophobic character based on their natural or modified carbohydrate character. They will comprise a member selected from the group consisting of gum arabic, 1-octenyl succinic anhydride treated gum arabic, 1-octenyl succinic anhydride treated starch, 1-octenyl succinic anhydride treated maltodextrin, 1-octenyl succinic anhydride treated dextrin, and mixtures of any two or more of these. The degree of esterification of the 1-octenyl succinic anhydride treated gum arabic, starches, dextrins and maltodextrins should be at least 0.01% and can be as high as commercially available, say 3%. While there is no known criticality on the degree of esterification, it will typically be above at least 0.1% and typically at least 1%.

Our findings are that specific water-soluble coating agents with a certain hydrophobic character, when combined with the pregelatinized starch, which is present in agglomerated form, alter the surface characteristics of the starch agglomerates such that the agglomerated starch now is spoon dispersible in both hot (e.g., 160° F.) and cold water with attainment of a viscosity plateau within 15 minutes, and preferably in less than 2 minutes, e.g., in a minute or less. Because the composition of the aqueous liquid used to dissolve or disperse the food thickener of the invention and the concentration of it in the liquid can affect the solution time, we standardize the procedure for measuring viscosity by utilizing the following procedure:

a. To a 600-ml beaker, add 473 g cold water (68-77 F.).
b. Weigh 18 g starch.
c. Add starch to water while mixing with spoon.
d. Start Timer.
e. Set Brookfield (RVT) at 10 rpm and #4 spindle.
f. Measure Brookfield viscosity start at 1 min, 5 min and 15 min after mixing. Take the measurement at the end of 60 seconds after inserting spindle in.

Thus, the viscosities as used in this description and the times indicated in association therewith are used consistently with this procedure.

The pregelatinized starch component can be combined with the specific water-soluble coating agents with the certain hydrophobic character by a number of processes effective for the purpose. For example, combination can be effected at any stage in processing, such as by dry blending, fluid bed agglomeration and preblending before pregelatinization. Among the preferred methods for making the food thickeners of the invention are those that can be efficiently carried out without the need for additional large scale equipment or separate processing steps of any significant expenditure of time and/or energy. Generally, the processes comprise combining the pregelatinized starch component with water-soluble coating material comprising a member selected from the group consisting of gum arabic, 1-octenyl succinic anhydride treated gum arabic, 1-octenyl succinic anhydride treated starch, 1-octenyl succinic anhydride treated maltodextrin, 1-octenyl succinic anhydride treated dextrin, and mixtures of any two or more of these, in a manner effective to coat the starch effectively to provide improved dispersibility in water.

Preferred processes include adding the water-soluble coating material to water used to agglomerate the starch, adding the water-soluble coating material to water used to suspend the starch component prior to spray drying a starch slurry, and intimately mixing the water-soluble coating material with the starch by dry mixing. In the case of dry blending, blending can be accomplished by blending dry agglomerated pregelatinized starch with the food ingredient possessing emulsifier functionality as a coating agent. For fluid bed agglomeration, application of the coating agent is made by putting the coating agent in water used to effect agglomeration. In one pretreatment process sequence, the coating agent is incorporated into the starch batch tank prior to the pregelatinization of the starch. Any combination of the above mentioned methods can be employed. Where solutions are employed, the water-soluble coating material will be employed in a concentration effective to provide the desired coating weight in the final thickener composition. It is an advantage of the invention that the coating materials can be varied in such a simple and effective manner.

The compositions made in the manner described above are useful as instant food thickeners. As noted, the term "food" as used herein is broad enough to include all edible compositions including those not necessarily intended as foods. The food compositions of the invention will comprise a food thickener as prepared above with at least one other edible ingredient selected from the group consisting of sweeteners, acidulents, flavors, colors, protein supplements, medicaments, and the like, in amounts sufficient to provide a dry mix for instant desserts such as pudding, beverages, soups, sauces, gravies or an orally-ingestible medical or nutritional supplement or treatment, etc.

The invention enables the production of a variety of dry food mixes comprising a food thickener according to the invention and one or more food ingredients, such as selected from the group consisting of sweeteners, acidulents, flavors, bulking agents, thickeners, fats and emulsifiers. To mix the dry ingredients, any suitable dry blender can be employed, such as a V-blender or a ribbon mixer. Agglomeration is useful for many products. If desired, the dry ingredients can be premixed and hydrated for packaging.

A sweetener can be a sugar, sugary material or other sweetener, such as any of the high intensity sweeteners known to the art. Among the sugars are the mono-saccharides, di-saccharides and polysaccharides and their degradation products; e.g., pentoses, including aldopentoses, methylpentoses, keptopentoses, like xylose and arabinose; a deoxyaldose like rhamnose, hexoses and reducing saccharides such as aldo hexoses like glucose, galactose and mannose; the ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides. Among the intense sweeteners are acesulfame-K, aspartame, cyclamates, dihydrochalcone, saccharin, stevioside, thaumatin and the like. Also, low-intensity, low-calorie sweeteners such as sorbitol and erythritol can be employed.

To prepare a dry mix composition for preparing an acidic food by mixing with water, the dry food thickener of the invention is preferably mixed in dry form with a suitable acid and, if desired other ingredients such as flavor. Any of the suitable food acidulents can be employed, e.g., adipic acid, citric acid, fumaric acid, lactic acid, malic acid (e.g. dl, malic), tartaric acid, and mixtures of at least two of these. In some cases it is desirable to add a buffering salt compatible with the other ingredients, particularly the acid components, such as a member selected from the group consisting of the sodium and potassium salts of the listed food acids. Among the specific useful weak acid salts are sodium citrate, potassium citrate, disodium phosphate, dipotassium phosphate, and mixtures of at least two of these. Sodium citrate is preferred for some formulations, but the potassium salts are preferred for low-sodium formulations. Also useful in some cases are flow control ingredients such as magnesium oxide or phosphate salts, e.g., tricalcium phosphate, monocalcium phosphate and dicalcium phosphate.

The food thickener of the invention can comprise some or substantially all gellable ingredients of a food or food mix. If desired, the food or food mix can comprise one or more additional jelling agents. Among these are proteinaceous materials such as gelatin, and whey protein concentrate, natural and synthetic hydrophilic colloids, such as carboxymethyl cellulose, vegetable gums such as locust bean gum, carob bean gum, guar gum, carrageenans and alginates.

Other ingredients may also be employed to impart their characteristic effects to the compositions of the present invention. Typical of such ingredients are flavoring agents, colorants, vitamins, minerals, and the like. Various flavors can be added directly to any food prepared according to the invention. Suitable flavoring agents can be employed to impart vanilla, cream, chocolate, coffee, maple, spice, mint, butter, caramel, fruit, savory and other flavors, including cheese, egg, meat, vegetable, and the like.

A model system was developed in the lab to show that this novel combination of ingredients also works with a bulk dried and ground system such as drum drying or extrusion.

The following examples are provided to further illustrate the invention and some of its practical aspects and are not to be taken as limiting in any regard. Unless otherwise indicated all parts and percentages are based on the weight of the composition at the indicated stage in processing.

EXAMPLE 1

The following ingredients are processed by the procedure that follows:

| Ingredient | Parts |
| --- | --- |
| Medium Crosslinked, Medium To High Hydroxy Propylated Di-Starch Phosphate Cold-Water Swelling Pregelatinized Potato Starch | 97.5 |
| OSA treated maltodextrin, 1.5% OSA treatment level | 2.5 |

These ingredients are combined by dissolving the OSA treated maltodextrin in the agglomeration water. The pregelatinized starch is placed on a fluidized bed and agglomerated and coated simultaneously by spraying the agglomeration water on the starch. The result of product is a starch having the following properties: good dispersibility without lumping in water with quick hydration to provide products with smooth appearance and texture and good surface sheen.

EXAMPLE 2

Spoon Stirrable Instant Country Gravy Mix Using the Easily Dispersible Pregelatinized Potato Starch The following ingredients are processed by the procedure that follows:

| Ingredients | Wet Basis % | Dry Basis % |
| --- | --- | --- |
| Shortening powder | 7.0 | 43.75 |
| Starch of Example 1 | 4.4 | 27.50 |
| Maltodextrin DE 10 | 1.9 | 11.875 |
| Wheat flour | 1.9 | 11.875 |
| Salt | 0.4 | 2.50 |
| Coarse ground black pepper | 0.4 | 2.50 |
| Cold or Hot water | 84.0 | |

Preparation Procedure: Thoroughly blend dry ingredients. Add to cold or hot water and whip until uniform. Put on steam table and serve. The result of the processing is a gravy having the following properties: lump free and smooth appearance and texture.

EXAMPLE 3

Honey Consistency Dysphagia Apple Juice Using the Easily Dispersible Pregelatinized Potato Starch The following ingredients are processed by the procedure that follows:

| Ingredient | Parts |
| --- | --- |
| Apple Juice | 94.5 |
| Starch of Example 1 | 5.5 |

Figure 2:
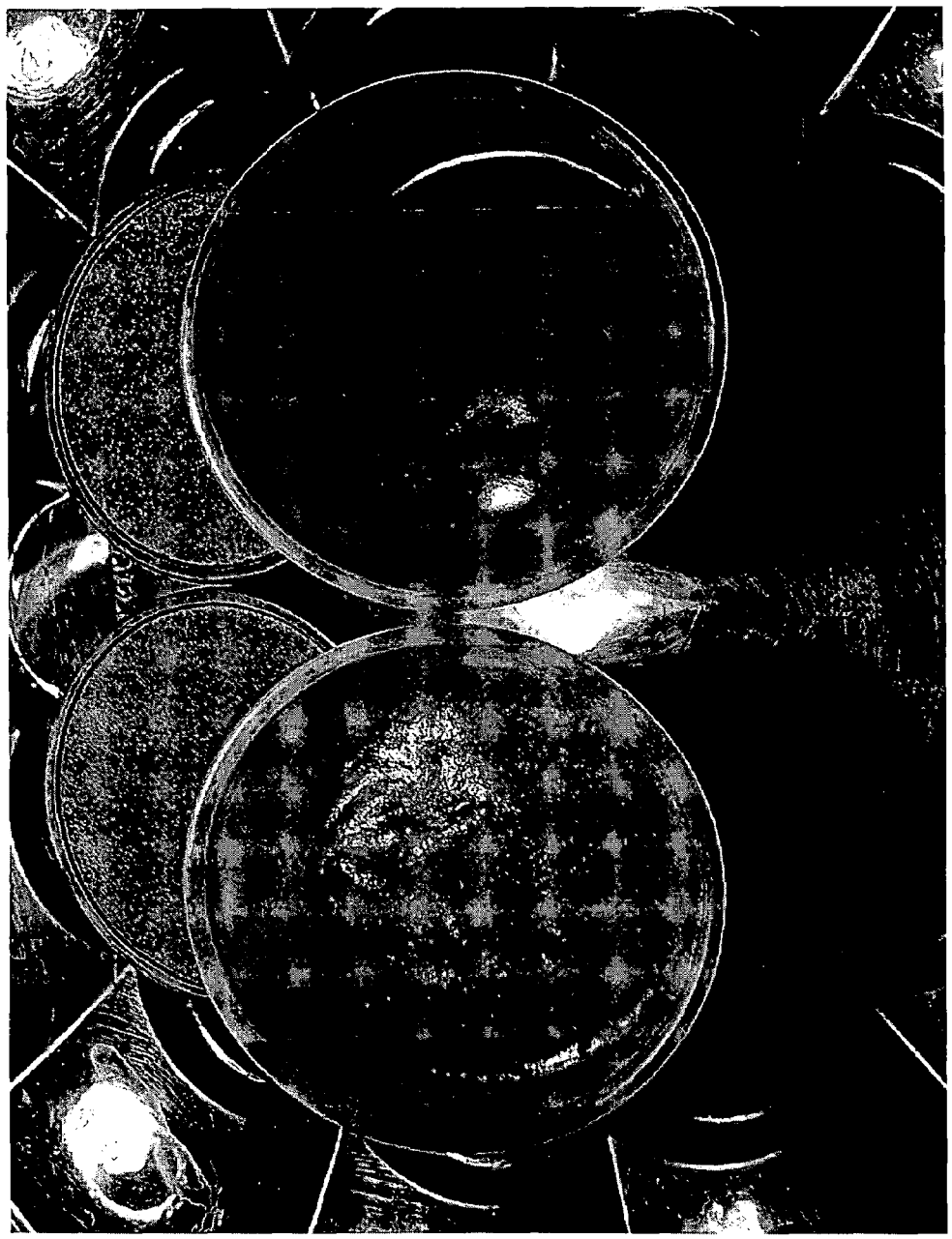
FIG. 2 is a black and white photograph showing the product prepared with the comparison starch used in the above comparison and the starch of the invention in the formulation of Example 3.

Preparation Procedure: add starch to apple juice. Spoon stir for a few seconds or until smooth. The result of processing is a apple juice beverage with Honey consistency for dysphagia patients having the following properties: lumps free, quick hydration and smooth appearance and texture. This product is compared to a like product made with the starch referenced below in Example 4. Attached as FIG. 2 is a black and white photograph wherein the sample on the right is the one made according to the invention and shows a very smooth surface with high sheen.

EXAMPLE 4

Viscosity Comparison

This example compares the viscosity of a product according to the invention as prepared in Example 1 above to a commercial starch promoted as being rapidly dispersible in cold water. To effect the comparison, 6.5 g of each is added to 118 g room temperature water, and the viscosity is measured with a Brookfield (RVT) viscometer at 10 rpm and with a #4 spindle after one minute of rotation. The results of the comparison are illustrated in FIG. 1, which is a graph showing Viscosity Development over Time following mixing.

The above description is intended to allow the person skilled in the art to practice the invention. It is not intended to detail all possible applications, variations and modifications that will be apparent to the skilled worker upon reading the description. It is intended, however, that all such applications, variations and modifications be included in the scope of the invention as defined by the claims which follow.

The invention claimed is:

1. An agglomerated food thickener comprising pregelatinized starch and a water-soluble coating agent selected from the group consisting of 1-octenyl succinic anhydride treated gum arabic, 1-octenyl succinic anhydride treated starches, 1-octenyl succinic anhydride treated maltodextrins, 1-octenyl succinic anhydride treated dextrins, and mixtures of any two or more of these, the coating agent being applied to the preglenatinized starch in an amount of from 0.01 to 15% by weight of the pregelantinized starch, said amount being effective to improve dispersibility of the pregelatinized starch in cold water at 66 to 77° F. and in hot water at 160° F.

2. An agglomerated food thickener according to claim 1 wherein the pregelatinized starch is a cold water swelling starch and the coating agent is employed at a level of at least 0.5%.

3. An agglomerated food thickener according to claim 1 wherein the pregelatinized starch is a drum dried starch.

4. An agglomerated food thickener according to claim 1 wherein the pregelatinized starch is a jet cooked starch.

5. An agglomerated food thickener according to claim 1 wherein the pregelatinized starch is an extruded starch.

6. An agglomerated food thickener according to claim 1 wherein the pregelatinized starch is a spray dried starch.

7. An agglomerated food thickener according to claim 1 wherein the pregelatinized starch is a spray cooked starch.

8. An agglomerated food thickener according to claim 1 wherein the pregelatinized starch is a combination of two or more starches.

9. An agglomerated food thickener according to claim 1 wherein the source of the pregelatinized starch is any one or combination of arrowroot, barley, corn, waxy maize, pea, potato, rice, waxy rice, sorghum, waxy sorghum, tapioca or wheat starch.

10. An agglomerated food thickener according to claim 1 wherein the coating agent is applied by adding it into water used for agglomeration of the pregelatinized starch.

11. An agglomerated food thickener according to claim 1 wherein the coating agent is applied by incorporating it into a starch slurry prior to gelatinization and subsequent agglomeration of the starch.

12. A process for making an agglomerated food thickener according to claim 1, which comprises dissolving the coating agent in water to form an aqueous solution and spraying the aqueous solution onto the pregelatinized starch under conditions effective to agglomerate the starch.

13. A process for making an agglomerated food thickener according to claim 1 which comprises dissolving the coating agent in a starch slurry, gelatinizing the starch in said slurry and agglomerating the resulting gelatinized starch.

14. An agglomerated food thickener according to claim 1 wherein the pregelatinized starch has a bulk density of between 0.12 and 0.45 g/ml.

15. An agglomerated food thickener according to claim 1 wherein the pregelatinized starch can be dispersed, without lumping, in both hot and cold water and reaches a plateau viscosity in distilled water in less than 15 minutes.

16. A composition comprising the food thickener of claim 1 used as an instant food thickener with at least one other edible ingredient selected from the group consisting of sweeteners, acidulents, flavors, colors, protein supplements, and medicaments, in amounts sufficient to provide a dry mix for instant desserts, beverages, soups, sauces, gravies or orally-ingestible medical or nutritional supplements.

17. A process for preparing a dry food mix comprising combining the food thickener as set forth in claim 1 with one or more food ingredients selected from the group consisting of sweeteners, acidulents, flavors, bulking agents, thickeners, fats and emulsifiers.

18. An agglomerated food thickener according to claim 1 wherein, the coating agent is applied to the pregelantinized starch in an amount of from 0.5 to 15% by weight of the pregelatinized starch.

19. An agglomerated food thickener according to claim 18 wherein the coating agent is applied by adding it into water used for agglomeration of the pregelatinized starch or dissolving the coating agent in water to form an aqueous solution and spraying the aqueous solution onto the pregelatinized starch under conditions effective to agglomerate the starch.

* * * * *